United States Patent
Kim et al.

(10) Patent No.: US 10,815,368 B2
(45) Date of Patent: *Oct. 27, 2020

(54) IONIZING RADIATION RESISTANT THERMOPLASTIC RESIN COMPOSITION AND ARTICLE COMPRISING THE SAME

(71) Applicant: Lotte Advanced Materials Co., Ltd., Yeosu-si (KR)

(72) Inventors: Yoen Kyoung Kim, Uiwang-si (KR); Joo Hyun Jang, Uiwang-si (KR); Ju Sung Kim, Uiwang-si (KR); Kyung Min Park, Uiwang-si (KR); Dong Hyun Park, Uiwang-si (KR); Seung Yong Bae, Uiwang-si (KR); Cheon Seok Yang, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 171 days.

This patent is subject to a terminal disclaimer.

(21) Appl. No.: 15/845,020

(22) Filed: Dec. 18, 2017

(65) Prior Publication Data

US 2018/0179373 A1  Jun. 28, 2018

(30) Foreign Application Priority Data

Dec. 23, 2016 (KR) .................. 10-2016-0177857

(51) Int. Cl.
| | |
|---|---|
| *C08L 25/12* | (2006.01) |
| *C08K 3/22* | (2006.01) |
| *C08L 71/02* | (2006.01) |
| *C08L 55/02* | (2006.01) |

(52) U.S. Cl.
CPC ............ *C08L 25/12* (2013.01); *C08K 3/22* (2013.01); *C08L 55/02* (2013.01); *C08L 71/02* (2013.01); *C08K 2003/2296* (2013.01); *C08K 2201/003* (2013.01); *C08K 2201/006* (2013.01); *C08L 2203/02* (2013.01); *C08L 2205/03* (2013.01); *C08L 2207/04* (2013.01)

(58) Field of Classification Search
CPC . C08L 55/02; C08L 71/02; C08K 2003/2296; C08K 5/06
See application file for complete search history.

(56) References Cited

U.S. PATENT DOCUMENTS

| | | | |
|---|---|---|---|
| 3,041,303 A | 6/1962 | Nelson | |
| 3,354,108 A | 11/1967 | Paradis et al. | |
| 4,331,786 A | 5/1982 | Foy et al. | |
| 4,356,300 A | 10/1982 | Isler et al. | |
| 4,612,340 A | 9/1986 | Ohachi | |
| 5,151,457 A * | 9/1992 | Ishida | C08K 5/41 524/157 |
| 5,714,534 A * | 2/1998 | Kojima | C08K 5/0075 524/156 |
| 5,714,545 A * | 2/1998 | Lee | C08L 23/12 525/193 |
| 5,906,679 A | 5/1999 | Watanabe et al. | |
| 6,166,116 A | 12/2000 | Sleeckx | |
| 6,297,307 B1 | 10/2001 | Eichenauer et al. | |
| 6,663,877 B1 | 12/2003 | Appleton et al. | |
| 8,128,998 B2 | 3/2012 | Li et al. | |
| 2002/0106413 A1 | 8/2002 | Herbst et al. | |
| 2002/0109805 A1 | 8/2002 | Baba | |
| 2003/0125413 A1 | 7/2003 | Herbst et al. | |
| 2005/0043485 A1 | 2/2005 | Lee et al. | |
| 2005/0131100 A1 | 6/2005 | Herbst et al. | |
| 2007/0009691 A1 | 1/2007 | Barre et al. | |
| 2007/0049678 A1 | 3/2007 | Kim et al. | |
| 2010/0264383 A1 | 10/2010 | Tooley et al. | |
| 2014/0017335 A1 | 1/2014 | Dimov et al. | |
| 2015/0284559 A1 | 10/2015 | Tai | |
| 2016/0326670 A1 | 11/2016 | Kang et al. | |
| 2017/0198132 A1 | 7/2017 | Choi et al. | |
| 2018/0112056 A1* | 4/2018 | Yang | C08K 5/0016 |
| 2018/0118914 A1 | 5/2018 | Bae et al. | |
| 2018/0179314 A1 | 6/2018 | Kim et al. | |

(Continued)

FOREIGN PATENT DOCUMENTS

| | | |
|---|---|---|
| CN | 1710153 A1 | 12/2005 |
| CN | 1919542 A * | 2/2007 |

(Continued)

OTHER PUBLICATIONS

Machine translated English language equivalent of JP Application No. H09-212736, which is the same as publication JP 11-035787 (1999, 10 pages).*

Machine translated English language equivalent of CN 1919542 (2007, 5 pages).*

Extended Search Report in commonly owned European Application No. 17210117.2, dated Apr. 30, 2018, pp. 1-5.

Office Action in commonly owned U.S. Appl. No. 15/798,819 dated May 13, 2019, pp. 1-20.

Office Action in commonly owned Korean Application No. 10-2016-0177857 dated Nov. 20, 2018, pp. 1-8.

Prasanna et al., "Insight into the Mechanism of Antibacterial Activity of ZnO: Surface Defects Mediated Reactive Oxygen Species Even in the Dark" Langmuir 2015, vol. 31, Jul. 29, 2015, pp. 9155-9162.

(Continued)

*Primary Examiner* — Brieann R Johnston
(74) *Attorney, Agent, or Firm* — Additon, Higgins & Pendleton, P.A.

(57) ABSTRACT

A thermoplastic resin composition and a molded article formed of the same. The thermoplastic resin composition includes: a thermoplastic resin including a rubber-modified vinyl graft copolymer and an aromatic vinyl copolymer resin; polyalkylene glycol; and zinc oxide, wherein the zinc oxide has an average particle diameter of about 0.5 μm to about 3 μm and a BET specific surface area of about 1 m²/g to about 10 m²/g. The thermoplastic resin composition and the molded article formed thereof can have good properties in terms of discoloration resistance, antibacterial activity, and the like even after being irradiated with ionizing radiation.

11 Claims, No Drawings

(56) References Cited

U.S. PATENT DOCUMENTS

| | | | |
|---|---|---|---|
| 2018/0179373 A1 | 6/2018 | Kim et al. | |
| 2018/0186989 A1 | 7/2018 | Lee et al. | |
| 2019/0299572 A1 | 10/2019 | Hirabayashi | |

FOREIGN PATENT DOCUMENTS

| | | | | |
|---|---|---|---|---|
| CN | 101001805 A | | 7/2007 | |
| CN | 101880426 A | | 11/2010 | |
| CN | 107974030 A | | 5/2018 | |
| EP | 1190622 A1 | | 3/2002 | |
| EP | 1510549 A1 | | 3/2005 | |
| EP | 3026082 A1 | | 6/2016 | |
| EP | 3326975 A1 | | 5/2018 | |
| EP | 3339367 A1 | | 6/2018 | |
| EP | 3339370 A1 | | 6/2018 | |
| FR | 1439417 A | | 5/1966 | |
| GB | 1040287 A | * | 8/1966 | ............ C08L 25/12 |
| JP | 55-133424 A | | 10/1980 | |
| JP | 56-045419 A | | 4/1981 | |
| JP | 63278951 A | * | 11/1988 | |
| JP | 06-287547 A1 | | 10/1994 | |
| JP | 08-253640 A | | 10/1996 | |
| JP | 10-182927 A | | 7/1998 | |
| JP | H10195309 A | | 7/1998 | |
| JP | 10-251444 A | | 9/1998 | |
| JP | 11-035787 A | | 2/1999 | |
| JP | 11035787 A | * | 2/1999 | |
| JP | 2001-220486 A | | 8/2001 | |
| JP | 2006-182841 A1 | | 7/2006 | |
| JP | 2014-172783 A | | 9/2014 | |
| JP | 2014-221708 A | | 11/2014 | |
| JP | 2016-121273 A | | 7/2016 | |
| KR | 10-2002-0008203 A | | 1/2002 | |
| KR | 10-0696385 B1 | | 3/2007 | |
| KR | 10-2007-0047073 A | | 5/2007 | |
| KR | 10-2010-0087603 A | | 8/2010 | |
| KR | 10-1334283 B1 | | 11/2013 | |
| KR | 10-1452020 B1 | | 10/2014 | |
| KR | 10-2016-0083527 A | | 7/2016 | |

OTHER PUBLICATIONS

Search Report in commonly owned European Application No. 17210669.2 dated Apr. 20, 2018, pp. 1-5.
Office Action in commonly owned Korean Application No. 10-2016-0184170 dated Sep. 6, 2018, pp. 1-6.
Extended Search Report in commonly owned European Application No. 17209267.8 dated Mar. 26, 2018, pp. 1-7.
Office Action in commonly owned Korean Application No. 10-2016-0176575 dated Nov. 1, 2018, pp. 1-7.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, pp. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2.
Database WPI, Week 201654, Thomson Scientific, London, GB, Abstract of KR 2016-0083527 (Kolon Plastics Inc.), pp. 1-2.
Office Action in commonly owned Chinese Application No. 201711062077.1 dated Jul. 12, 2019, pp. 1-7.
Office Action in commonly owned Chinese Application No. 2017110073953.8 dated Jul. 31, 2019, pp. 1-6.
Office Action in commonly owned U.S. Appl. No. 15/844,980 dated Sep. 11, 2019, pp. 1-5.
Machine translated English language equivalent of H09-061580, which is the same as JP Publication JP 10-251444 (1998, 14 pages).
Final Office Action in commonly owned U.S. Appl. No. 15/844,980 dated Mar. 10, 2020, pp. 1-10.
Google translation of JP 11035787 (1999, 8 pages).
Google translation of JP 06287547 (1994, 5 pages).

* cited by examiner

IONIZING RADIATION RESISTANT THERMOPLASTIC RESIN COMPOSITION AND ARTICLE COMPRISING THE SAME

CROSS-REFERENCE TO RELATED APPLICATION

This application claims priority under 35 USC Section 119 to and the benefit of Korean Patent Application 10-2016-0177857, filed on Dec. 23, 2016, the entire disclosure of which is incorporated herein by reference.

FIELD

The present invention relates to an ionizing radiation resistant thermoplastic resin composition and a molded article including the same.

BACKGROUND

Medical supplies require complete sterilization. For complete sterilization, there have been proposed contact treatment using sterilization gases such as ethylene oxide, heat treatment in an autoclave, and irradiation treatment using ionizing radiation such as gamma rays, electron beams, and X-rays. Thereamong, contact treatment using ethylene oxide has a problem in that ethylene oxide has toxicity and instability and thus causes environmental problems upon disposal thereof. In addition, heat treatment in an autoclave can cause degradation of a resin during high temperature treatment and requires high energy costs and a drying process for removing residual moisture from treated components. Thus, irradiation treatment using ionizing radiation, which allows treatment at low temperature and is relatively economical, is generally used for sterilization.

Thermoplastic resins such as acrylonitrile-butadiene-styrene copolymer (ABS) resins are used in a wide range of applications due to good mechanical properties and thermal properties thereof. In addition, thermoplastic resins have good hygienic properties, rigidity and heat resistance and thus can be used as a material for medical supplies such as medical devices, surgical instruments, and/or surgical appliances.

However, such a thermoplastic resin can suffer from yellowing and deterioration in physical properties due to radical generation in the resin when irradiated with ionizing radiation. To overcome these problems, there has been proposed a method of stabilizing a thermoplastic resin by adding various additives such as a silicone compound, an antioxidant such as a sulfone compound, a heat stabilizer, and a UV stabilizer. However, such a method has failed to completely solve the problems such as yellowing. In addition, such a resin is required to have antibacterial properties to be used for applications where frequent contact with humans is inevitable, such as medical supplies, toys, and food containers.

Therefore, there is a need for an ABS-based thermoplastic resin composition which can have good properties in terms of discoloration resistance and/or antibacterial properties even after being irradiated with ionizing radiation and thus can be used as a material for ionizing radiation resistant medical supplies.

SUMMARY OF THE INVENTION

Embodiments provide an ionizing radiation resistant thermoplastic resin composition which can have good properties in terms of discoloration resistance and/or antibacterial properties even after being irradiated with ionizing radiation, and a molded article formed thereof.

A thermoplastic resin composition includes: a thermoplastic resin including a rubber-modified vinyl graft copolymer and an aromatic vinyl copolymer resin; polyalkylene glycol; and zinc oxide, wherein the zinc oxide has an average particle diameter of about 0.5 μm to about 3 μm and a BET specific surface area of about 1 $m^2/g$ to about 10 $m^2/g$.

The thermoplastic resin composition may include: about 100 parts by weight of the thermoplastic resin comprising 5 wt % to about 60 wt % of the rubber-modified vinyl graft copolymer and about 40 wt % to about 95 wt % of the aromatic vinyl copolymer resin; about 0.1 parts by weight to about 5 parts by weight of the polyalkylene glycol; and about 0.1 parts by weight to about 30 parts by weight of the zinc oxide.

The rubber-modified vinyl graft copolymer may be obtained by grafting a monomer mixture comprising an aromatic vinyl monomer and a vinyl cyanide monomer to a rubber polymer.

The aromatic vinyl copolymer resin may be a copolymer of an aromatic vinyl monomer and a monomer copolymerizable with the aromatic vinyl monomer.

The zinc oxide may have a peak intensity ratio (B/A) of about 0.01 to about 1, wherein A indicates a peak in the wavelength range of 370 nm to 390 nm and B indicates a peak in the wavelength range of 450 nm to 600 nm in photoluminescence measurement.

The zinc oxide may have a peak position degree (2θ) in the range of 35° to 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta}, \quad \text{[Equation 1]}$$

where K is a shape factor, λ is an X-ray wavelength, β is an FWHM value (degree) of an X-ray diffraction peak, and θ is a peak position degree.

The thermoplastic resin composition may have a difference in yellow index (ΔYI) of about 0.5 to about 5, as calculated on a 3.2 mm thick specimen according to Equation 2:

$$\Delta YI = YI_1 - YI_0$$

wherein $YI_0$ is a yellow index (YI) of the specimen before irradiation with gamma rays, as measured in accordance with ASTM D1925, and $YI_1$ is a yellow index (YI) of the specimen, as measured in accordance with ASTM D1925 after the specimen is irradiated with 40 kGy gamma rays and allowed to stand for 21 days.

The thermoplastic resin composition may have an antibacterial activity of about 2 to about 7 (against *Staphylococcus*) and about 2 to about 7 (against *Escherichia coli*), for example, about 4 to about 7 (against *Staphylococcus*) and about 2.4 to about 7 (against *Escherichia coli*), as measured on a 5 cm×5 cm specimen in accordance with JIS Z 2801 after the specimen is inoculated with each of *Staphylococcus aureus* and *Escherichia coli*, followed by culturing under conditions of 35° C. and 90% RH for 24 hours.

Other embodiments relate to a molded article. The molded article may be formed of the thermoplastic resin composition as set forth above.

The molded article may be an ionizing radiation resistant medical supply.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to the present invention can have ionizing radiation resistance and includes: (A) a thermoplastic resin including (A1) a rubber-modified vinyl graft copolymer and an aromatic vinyl copolymer resin; (B) a polyalkylene glycol compound; and (C) zinc oxide.

(A) Thermoplastic Resin

According to the present invention, the thermoplastic resin may be a rubber-modified vinyl copolymer resin including (A1) the rubber-modified vinyl graft copolymer and (A2) the aromatic vinyl copolymer resin.

(A1) Rubber-Modified Vinyl Graft Copolymer

In one embodiment, the rubber-modified vinyl graft copolymer may be prepared by graft polymerization of a monomer mixture including an aromatic vinyl monomer and a vinyl cyanide monomer to a rubber polymer. For example, the rubber-modified vinyl graft copolymer may be obtained by grafting the monomer mixture including the aromatic vinyl monomer and the vinyl cyanide monomer to the rubber polymer. The monomer mixture may further include a monomer imparting processability and heat resistance, as needed. Here, the polymerization may be performed by any typical polymerization method known in the art, such as emulsion polymerization and suspension polymerization. In addition, the rubber-modified vinyl graft copolymer may have a core (rubber polymer)-shell (copolymer of the monomer mixture) structure, without being limited thereto.

Examples of the rubber polymer may include without limitation diene rubbers such as polybutadiene, poly(styrene-butadiene), and poly(acrylonitrile-butadiene), saturated rubbers obtained by adding hydrogen to the diene rubbers, isoprene rubbers, $C_2$ to $C_{10}$ alkyl (meth)acrylate rubbers, $C_2$ to $C_{10}$ alkyl (meth)acrylate-styrene copolymers, and ethylene-propylene-diene monomer terpolymer (EPDM). These may be used alone or as a mixture thereof. For example, the rubber polymer may be a diene rubber and/or a (meth)acrylate rubber, for example a butadiene rubber and/or a butyl acrylate rubber.

The rubber polymer (rubber particles) may have an average (z-average) particle diameter of about 0.05 μm to about 6 μm, for example, about 0.15 μm to about 4 μm, and as another example about 0.25 μm to about 3.5 μm. Within this range, the thermoplastic resin composition can have good properties in terms of impact resistance and/or appearance.

In one embodiment, the rubber polymer may be present in an amount of about 20 wt % to about 70 wt %, for example, about 25 wt % to about 60 wt %, based on the total weight (100 wt %) of the rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 75 wt % based on the total weight (100 wt %) of the rubber-modified vinyl graft copolymer.

In some embodiments, the rubber-modified vinyl graft copolymer may include the rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments, the amount of the rubber polymer can be in a range from about any of the foregoing amounts to about any other of the foregoing amounts.

In some embodiments, the rubber-modified vinyl graft copolymer may include the monomer mixture in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer mixture can be in a range from about any of the foregoing amounts to about any other of the foregoing amounts.

Within these ranges, the thermoplastic resin composition can have good properties in terms of impact resistance and/or appearance.

The aromatic vinyl monomer is graft-copolymerizable with the rubber copolymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

The aromatic vinyl monomer may be present in an amount of about 10 wt % to about 90 wt %, for example, about 40 wt % to about 90 wt %, based on the total weight (100 wt %) of the monomer mixture. In some embodiments, the monomer mixture may include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

Within this range, the thermoplastic resin composition can have good properties in terms of processability and/or impact resistance.

The vinyl cyanide monomer is copolymerizable with the aromatic vinyl monomer and may include, for example, acrylonitrile, methacrylonitrile, ethacrylonitrile, phenylacrylonitrile, α-chloroacrylonitrile, and fumaronitrile. These may be used alone or as a mixture thereof. For example, the vinyl cyanide monomer may be acrylonitrile and/or methacrylonitrile.

The vinyl cyanide monomer may be present in an amount of about 10 wt % to about 90 wt %, for example, about 10 wt % to about 60 wt %, based on the total weight (100 wt %) of the monomer mixture. In some embodiments, the monomer mixture may include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the vinyl cyanide monomer can be in a range from about any of the foregoing amounts to about any other of the foregoing amounts.

Within these ranges, the thermoplastic resin composition can have good chemical resistance and/or mechanical properties.

Examples of the monomer imparting processability and heat resistance may include (meth)acrylic acid, maleic anhydride, and/or N-substituted maleimide, without being limited thereto. When the monomer imparting processability and heat resistance is used, the monomer imparting processability and heat resistance may be present in an amount of about 15 wt % or less, for example, about 0.1 wt % to about 10 wt %, based on the total weight (100 wt %) of the monomer mixture.

In some embodiments, the monomer mixture may include the monomer imparting processability and heat resistance in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the thermoplastic resin composition can exhibit processability and/or heat resistance with minimum or no deterioration in other properties.

Examples of the rubber-modified vinyl graft copolymer may include an acrylonitrile-butadiene-styrene graft copolymer (g-ABS) in which a styrene monomer as the aromatic vinyl compound and an acrylonitrile monomer as the vinyl cyanide compound are grafted to a butadiene rubber polymer and/or an acrylate-styrene-acrylonitrile graft copolymer (g-ASA) in which a styrene monomer as the aromatic vinyl compound and an acrylonitrile monomer as the vinyl cyanide compound are grafted to a butyl acrylate rubber polymer.

In one embodiment, the rubber-modified vinyl graft copolymer may be present in an amount of about 5 wt % to about 60 wt %, for example, about 20 wt % to about 50 wt %, and as another example about 21 wt % to about 45 wt %, based on the total weight (100 wt %) of the thermoplastic resin (the rubber-modified vinyl graft copolymer and the aromatic vinyl copolymer resin). In some embodiments, the thermoplastic resin may include the rubber-modified vinyl graft copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the rubber-modified vinyl graft copolymer can be in a range from about any of the foregoing amounts to about any other of the foregoing amounts.

Within this range, the thermoplastic resin composition can have good properties in terms of impact resistance, flowability (moldability), appearance, and/or balance therebetween.

(A2) Aromatic Vinyl Copolymer Resin

According to the present invention, the aromatic vinyl copolymer resin may be any typical aromatic vinyl copolymer resin used in rubber-modified vinyl copolymer resins. For example, the aromatic vinyl copolymer resin may be a copolymer of a monomer mixture including an aromatic vinyl monomer and a monomer copolymerizable with the aromatic vinyl monomer, such as a vinyl cyanide monomer.

In one embodiment, the aromatic vinyl copolymer resin may be prepared by mixing the aromatic vinyl monomer and the monomer copolymerizable with the aromatic vinyl monomer, followed by polymerization of the mixture. Here, the polymerization may be performed by any typical polymerization method known in the art, such as emulsion polymerization, suspension polymerization, and/or mass polymerization.

Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

The aromatic vinyl monomer may be present in an amount of about 20 wt % to about 90 wt %, for example, about 30 wt % to about 85 wt %, based on the total weight (100 wt %) of the aromatic vinyl copolymer resin. In some embodiments, the aromatic vinyl copolymer resin may include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

Within this range, the thermoplastic resin composition can have good properties in terms of impact resistance, flowability, and the like.

Examples of the monomer copolymerizable with the aromatic vinyl monomer may include without limitation vinyl cyanide compounds, such as acrylonitrile, methacrylonitrile, ethacrylonitrile, phenylacrylonitrile, α-chloroacrylonitrile, and fumaronitrile. These may be used alone or as a mixture thereof.

The monomer copolymerizable with the aromatic vinyl monomer may be present in an amount of about 10 wt % to about 80 wt %, for example, about 15 wt % to about 70 wt %, based on the total weight (100 wt %) of the aromatic vinyl copolymer resin. In some embodiments, the aromatic vinyl copolymer resin may include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can have good properties in terms of impact resistance, flowability, and the like.

In one embodiment, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength, moldability, and the like.

In one embodiment, the aromatic vinyl copolymer resin may be present in an amount of about 40 wt % to about 95 wt %, for example, about 50 wt % to about 80 wt %, specifically about 55 wt % to about 79 wt %, based on the total weight of the thermoplastic resin. In some embodiments, the thermoplastic resin may include the aromatic vinyl copolymer resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the aromatic vinyl copolymer resin can be in a range from about any of the foregoing amounts to about any other of the foregoing amounts.

Within this range, the thermoplastic resin composition can have good properties in terms of impact resistance, flowability (moldability), and the like.

(B) Polyalkylene Glycol Compound

In the present invention, the polyalkylene glycol compound can remarkably improve ionizing radiation resistance of the thermoplastic resin composition in conjunction with zinc oxide. Examples of the polyalkylene glycol compound may include without limitation polyalkylene glycol, ethers of polyalkylene glycol, and/or esters of polyalkylene glycol. The polyalkylene glycol compound may include any typical polyol used in ionizing radiation resistant resin compositions, for example, polyethylene glycol, polyethylene glycol methyl ether, polyethylene glycol dimethyl ether, polyethylene glycol dodecyl ether, polyethylene glycol benzyl ether, polyethylene glycol dibenzyl ether, polyethylene glycol-4-nonylphenyl ether, polypropylene glycol, polypropylene glycol methyl ether, polypropylene glycol dimethyl ether, polypropylene glycol dodecyl ether, polypropylene glycol benzyl ether, polypropylene glycol dibenzyl ether, polypropylene glycol-4-nonylphenyl ether, polytetramethylene glycol, polyethylene glycol diacetate ester, polyethylene glycol acetate propionate ester, polyethylene glycol dibutyrate ester, polyethylene glycol distearate ester, polyethylene glycol dibenzoate ester, polyethylene glycol di-2,6-dimethyl benzoate ester, polyethylene glycol di-p-tert-butyl benzoate ester, polyethylene glycol dicaprylate ester, polypropylene glycol diacetate ester, polypropylene glycol acetate propionate ester, polypropylene glycol dibutyrate ester, polypropylene glycol distearate ester, polypropylene glycol dibenzoate ester, polypropylene glycol di-2,6-dimethyl benzoate ester, polypropylene glycol di-p-tert-butyl benzoate ester, and polypropylene glycol dicaprylate ester. These may be used alone or as a mixture thereof.

In one embodiment, the polyalkylene glycol compound may have a number average molecular weight (Mn) of about 1,000 g/mol to about 5,000 g/mol, for example about 1,500 g/mol to about 3,000 g/mol, as measured by gel permeation chromatography (GPC).

In one embodiment, the polyalkylene glycol compound may be present in an amount of about 0.1 parts by weight to about 5 parts by weight, for example, about 0.2 parts by weight to about 5 parts by weight, and as another example about 0.3 parts by weight to about 3 parts by weight, relative to about 100 parts by weight of the thermoplastic resin. In some embodiments, the thermoplastic resin composition may include the polyalkylene glycol compound in an amount of about 0.1, 0.2, 0.3, 0.4, 0.5, 0.6, 0.7, 0.8, 0.9, 1, 2, 3, 4, or 5 parts by weight. Further, according to some embodiments, the amount of the polyalkylene glycol compound can be in a range from about any of the foregoing amounts to about any other of the foregoing amounts.

Within this range, the thermoplastic resin composition can have good discoloration resistance after being irradiated with ionizing radiation.

(C) Zinc Oxide

In the present invention, the zinc oxide can remarkably improve antibacterial properties (activity) and/or ionizing radiation resistance of the thermoplastic resin composition in conjunction with the polyalkylene glycol compound and may have an average particle diameter of about 0.5 μm to about 3 μm, for example, about 1 μm to about 3 μm, as measured using a particle analyzer, a BET specific surface area of about 1 $m^2$/g to about 10 $m^2$/g, for example, about 1 $m^2$/g to about 7 $m^2$/g, and a purity of about 99% or higher.

In some embodiments, the zinc oxide may have an average particle diameter (D50) of about 0.5, 0.6, 0.7, 0.8, 0.9, 1, 2, or 3 μm. Average particle diameter can be measured in a single particle state (not forming a secondary particle through agglomeration of particles) using a particle analyzer (Laser Diffraction Particle Size Analyzer LS I3 320, Beckman Coulter Co., Ltd.) as known in the art and as understood by the skilled artisan.

In some embodiments, the zinc oxide may have a BET specific surface area of about 1, 2, 3, 4, 5, 6, 7, 8, 9, or 10 $m^2$/g as measured by a nitrogen gas adsorption method using a BET analyzer (Surface Area and Porosity Analyzer ASAP 2020, Micromeritics Co., Ltd.).

If these parameters of the zinc oxide are outside these ranges, the thermoplastic resin composition can have poor properties in terms of antibacterial properties (activity) and/or ionizing radiation resistance.

In one embodiment, the zinc oxide may have a peak intensity ratio (B/A) of about 0.01 to about 1, for example, about 0.1 to about 1, wherein A indicates a peak in the wavelength range of 370 nm to 390 nm and B indicates a peak in the wavelength range of 450 nm to 600 nm in photoluminescence measurement. In some embodiments, the zinc oxide may have a peak intensity ratio (B/A) of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1. Within this range, the thermoplastic resin composition can have further improved properties in terms of antibacterial properties (activity) and/or discoloration resistance.

In one embodiment, the zinc oxide may have a peak position degree (2θ) in the range of 35° to 37° and a crystallite size of about 1,000 Å to about 2,000 Å, for example, about 1,200 Å to about 1,800 Å in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, discoloration resistance, and antibacterial properties (activity).

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

In one embodiment, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, as needed, and cooling the reactor to room temperature (about 20° C. to about 30° C.).

In one embodiment, the zinc oxide may be present in an amount of about 0.1 parts by weight to about 30 parts by weight, for example about 1 part by weight to about 25 parts by weight, and as another example about 2 parts by weight to about 15 parts by weight, relative to about 100 parts by weight of the thermoplastic resin. In some embodiments, the thermoplastic resin composition may include the zinc oxide in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments, the amount of the zinc oxide can be in a range from about any of the foregoing amounts to about any other of the foregoing amounts.

Within this range, the thermoplastic resin composition can have good properties in terms of discoloration resistance and/or antibacterial properties (activity) after being irradiated with ionizing radiation.

In one embodiment, a weight ratio of the polyalkylene glycol compound (B) to the zinc oxide (C) (B:C) may range from about 1:0.3 to about 1:10, for example, about 1:1 to about 1:5. Within this range, the thermoplastic resin composition can have further improved properties in terms of antibacterial properties (activity), ionizing radiation resistance, and/or heat resistance.

According to the present invention, the thermoplastic resin composition may further include any typical additives used in thermoplastic resin compositions. Examples of the additives may include fillers, reinforcing agents, stabilizers, colorants, antioxidants, antistatic agents, flow enhancers, release agents, nucleating agents, and combinations thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin.

According to the present invention, the thermoplastic resin composition may be prepared in pellet form by mixing the aforementioned components, followed by melt extrusion using a typical twin-screw extruder at about 200° C. to about 280° C., for example, about 220° C. to about 250° C.

In one embodiment, the thermoplastic resin composition may have a difference in yellow index ($\Delta YI$) of about 0.5 to about 5, for example, about 2 to about 4, as calculated on a 3.2 mm thick specimen according to Equation 2:

$$\Delta YI = YI_1 - YI_0 \quad \text{[Equation 2]}$$

wherein $YI_0$ is a yellow index (YI) of the specimen before irradiation with gamma rays, as measured in accordance with ASTM D1925, and $YI_1$ is a yellow index (YI) of the specimen, as measured in accordance with ASTM D1925 after the specimen is irradiated with 40 kGy gamma rays and allowed to stand for 21 days.

In one embodiment, the thermoplastic resin composition may have an antibacterial activity of about 2 to about 7 (against *Staphylococcus*) and about 2 to about 7 (against *Escherichia coli*), for example, about 4 to about 7 (against *Staphylococcus*) and about 2.4 to about 7 (against *Escherichia coli*), as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% relative humidity (RH) for 24 hours.

In accordance with the present invention, a molded article may be manufactured (formed) from the ionizing radiation resistant thermoplastic resin composition as set forth above by any known molding method. The molded article can have good properties in terms of discoloration resistance, antibacterial properties (activity), and/or impact resistance even after being irradiated with ionizing radiation and thus may be used in ionizing radiation resistant medical supplies including without limitation: container-type packaging means for receiving and/or packaging syringes, surgical instruments, intravenous injectors, and surgical appliances; components of medical apparatuses, such as artificial lungs, artificial kidneys, anesthesia inhalers, intravenous connectors, hemodialyzers, hemofilters, safety syringes, and accessories therefor; and components of blood centrifuges, surgical instruments, surgical appliances, and intravenous injectors.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows.

(A) Thermoplastic Resin (A1) Rubber-Modified Vinyl Graft Copolymer

A g-ABS resin prepared by grafting 55 wt % of styrene and acrylonitrile (weight ratio: 75/25) to 45 wt % of butadiene rubber particles having a Z-average particle diameter of 310 nm (A2) Aromatic Vinyl Copolymer Resin A SAN resin (weight average molecular weight: 130,000 g/mol) prepared by polymerization of 82 wt % styrene with 18 wt % acrylonitrile (B) Polyalkylene Glycol Compound Polypropylene glycol (number average molecular weight (Mn): 2,000 g/mol)

(C) Zinc Oxide

Zinc oxide (C1), zinc oxide (C2), and zinc oxide (C3) each having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1.

TABLE 1

|  | (C1) | (C2) | (C3) |
| --- | --- | --- | --- |
| Average particle diameter (μm) | 1.2 | 1.0 | 1.1 |
| BET surface area (m2/g) | 4 | 6 | 15 |
| Purity (%) | 99 | 99 | 97 |
| PL peak intensity ratio (B/A) | 0.28 | 0.05 | 9.8 |
| Crystallite size (Å) | 1,417 | 1,229 | 503 |

Property Evaluation (1) Average particle diameter (unit: μm): Average particle diameter is measured using a particle analyzer (Laser Diffraction Particle Size Analyzer LS I3 320, Beckman Coulter Co., Ltd.).

(2) BET surface area (unit: m²/g): BET surface area is measured by a nitrogen gas adsorption method using a BET analyzer (Surface Area and Porosity Analyzer ASAP 2020, Micromeritics Co., Ltd.).

(3) Purity (unit: %): Purity is measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature is detected by a CCD detector in a photoluminescence measurement method, in which the CCD detector is maintained at −70° C. A peak intensity ratio (B/A) of peak A in the wavelength range of 370 nm to 390 nm to peak B in the wavelength range of 450 nm to 600 nm is measured. Here, an injection molded specimen is irradiated with laser beams without separate treatment upon PL analysis, and zinc oxide powder is compressed in a pelletizer having a diameter of 6 mm to prepare a flat specimen.

(5) Crystallite size (unit: Å): Crystallite size is measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used in this test. For more accurate analysis, the injection molded specimen is subjected to heat treatment at 600° C. in air for 2 hours to remove a polymer resin therefrom before XRD analysis.

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

Examples 1 to 7 and Comparative Examples 1 to 5

The above components are mixed in amounts as listed in Tables 2 to 3, followed by melt extrusion at 220° C., thereby preparing a thermoplastic resin composition in pellet form. Extrusion is performed using a twin-screw extruder (L/D=36, φ45 mm). The prepared pellets are dried at 80° C. for 2 hours or more, followed by injection molding using a 6 oz. injection molding machine (molding temperature: 220° C., mold temperature: 70° C.), thereby preparing a specimen. The prepared specimen is evaluated as to the following properties and results are shown in Tables 2 to 3.

Property Evaluation (1) Discoloration resistance: Difference in yellow index (YI) (ΔYI) is calculated on a 3.2 mm thick specimen according to Equation 2:

$$\Delta YI = YI_1 - YI_0 \quad \text{[Equation 2]}$$

wherein $YI_0$ is a yellow index (YI) of a 3.2 mm thick specimen before irradiation with gamma rays, as measured in accordance with ASTM D1925, and $YI_1$ is a yellow index (YI) of the specimen, as measured in accordance with ASTM D1925 after the specimen is irradiated with 40 kGy gamma rays and allowed to stand for 12 or 21 days.

(2) Antibacterial activity: Antibacterial activity is measured on a 5 cm×5 cm specimen obtained by inoculation with each of *Staphylococcus aureus* and *Escherichia coil*, followed by culturing under conditions of 35° C. and 90% RH for 24 hours, in accordance with JIS Z 2801.

TABLE 2

|   |   | Example | | | | | | |
|---|---|---|---|---|---|---|---|---|
|   |   | 1 | 2 | 3 | 4 | 5 | 6 | 7 |
| (A) (wt %) | (A1) | 22 | 22 | 22 | 22 | 22 | 22 | 22 |
|  | (A2) | 78 | 78 | 78 | 78 | 78 | 78 | 78 |
| (B) (parts by weight) |  | 0.1 | 0.5 | 5 | 0.5 | 0.5 | 0.5 | 0.5 |
| (C) (parts by weight) | (C1) | 2 | 2 | 2 | 1 | 25 | — | — |
|  | (C2) | — | — | — | — | — | 1 | 25 |
| Difference in yellow index (ΔYI) |  | 3 | 2 | 1.5 | 4 | 2 | 2 | 2 |
| Antibacterial activity | *Staphylococcus aureus* | 4.6 | 4.6 | 4.6 | 4.6 | 4.6 | 4.6 | 4.6 |
|  | *Escherichia coli* | 6.4 | 6.4 | 6.4 | 2.8 | 6.4 | 2.4 | 6.4 |

* Parts by weight: Relative to 100 parts by weight of (A)

TABLE 3

|   |   | Comparative Example | | | | |
|---|---|---|---|---|---|---|
|   |   | 1 | 2 | 3 | 4 | 5 |
| (A) (wt %) | (A1) | 22 | 22 | 22 | 22 | 22 |
|  | (A2) | 78 | 78 | 78 | 78 | 78 |
| (B) (parts by weight) |  | — | 0.5 | 0.5 | 0.5 | — |
| (C3) (parts by weight) |  | — | 1 | 2 | 25 | 2 |
| Difference in yellow index (ΔYI) |  | 25 | 13 | 11 | 8 | 10 |
| Antibacterial activity | *Staphylococcus aureus* | 0.1 | 3.3 | 4.6 | 4.6 | 4.6 |
|  | *Escherichia coli* | 0.3 | 1.5 | 2.0 | 6.3 | 2.0 |

* Parts by weight: Relative to 100 parts by weight of (A)

From Tables 1 and 2, it can be seen that the thermoplastic resin composition according to the present invention exhibit good properties in terms of ionizing radiation resistance, antibacterial properties (activity), and the like.

Conversely, it can be seen that the thermoplastic resin composition of Comparative Example 1 not using polyalkylene glycol and zinc oxide exhibits poor properties in terms of ionizing radiation resistance, antibacterial properties (activity), and the like, the thermoplastic resin compositions of Comparative Examples 2, 3, and 4 using the zinc oxide (C3) instead of the zinc oxide according to the present invention ((C1) or (C2)) exhibit relatively poor antibacterial properties (activity) and poor properties in terms of ionizing radiation resistance (discoloration resistance after irradiation with ionizing radiation) and color, and the thermoplastic resin composition of Comparative Example 5 in which polyalkylene glycol is not used and the zinc oxide (C3) is used exhibits poor properties in terms of ionizing radiation resistance (discoloration resistance after irradiation with ionizing radiation) and color.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
    about 100 parts by weight of a thermoplastic resin comprising about 5 wt % to about 60 wt % of a rubber-modified vinyl graft copolymer and about 40 wt % to about 95 wt % of an aromatic vinyl copolymer resin;
    about 0.1 parts by weight to about 5 parts by weight of polyalkylene glycol having a number average molecular weight of 1,500 g/mol to 5,000 g/mol as measured by gel permeation chromatography (GPC), based on about 100 parts by weight of the thermoplastic resin; and
    about 0.1 parts by weight to about 30 parts by weight of zinc oxide, based on about 100 parts by weight of the thermoplastic resin,
    wherein the zinc oxide has an average particle diameter of about 0.5 μm to about 3 μm and a BET specific surface area of about 1 m²/g to about 10 m2/g.

2. The thermoplastic resin composition according to claim 1, wherein the rubber-modified vinyl graft copolymer is obtained by grafting a monomer mixture comprising an aromatic vinyl monomer and a vinyl cyanide monomer to a rubber polymer.

3. The thermoplastic resin composition according to claim 1, wherein the aromatic vinyl copolymer resin is a copolymer of an aromatic vinyl monomer and a monomer copolymerizable with the aromatic vinyl monomer.

4. The thermoplastic resin composition according to claim 1, wherein the zinc oxide has a peak intensity ratio (B/A) of about 0.01 to about 1, where A indicates intensity of the peak in the wavelength range of 370 nm to 390 nm and B indicates intensity of the peak in the wavelength range of 450 nm to 600 nm in photoluminescence measurement.

5. The thermoplastic resin composition according to claim 1, wherein the zinc oxide has a peak position degree (2θ) in the range of 35° to 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

6. The thermoplastic resin composition according to claim 1, wherein the thermoplastic resin composition has a difference in yellow index (ΔYI) of about 0.5 to about 5, as calculated on a 3.2 mm thick specimen according to Equation 2:

[Equation 2]

$\Delta YI = YI_1 - YI_0$ where $YI_0$ is a yellow index (YI) of the specimen before irradiation with gamma rays, as measured in accordance with ASTM D1925, and $YI_1$ is a yellow index (YI) of the specimen, as measured in accordance with ASTM D1925 after the specimen is irradiated with 40 kGy gamma rays and allowed to stand for 21 days.

7. The thermoplastic resin composition according to claim 1, wherein the thermoplastic resin composition has an antibacterial activity of about 2 to about 7 against *Staphylococcus* and an antibacterial activity of about 2 to about 7 against *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

8. The thermoplastic resin composition according to claim 7, wherein the thermoplastic resin composition has an antibacterial activity of about 4 to about 7 against *Staphylococcus* and about 2.4 to about 7 against *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

9. A molded article formed of the thermoplastic resin composition according to claim 1.

10. The molded article according to claim 9, wherein the molded article is an ionizing radiation resistant medical supply.

11. The thermoplastic resin composition according to claim 1, wherein the polyalkylene glycol has a number average molecular weight of 2,000 g/mol to 5,000 g/mol as measured by gel permeation chromatography (GPC).

* * * * *